United States Patent
Lin et al.

(10) Patent No.: US 11,303,431 B2
(45) Date of Patent: Apr. 12, 2022

(54) METHOD AND SYSTEM FOR PERFORMING SSL HANDSHAKE

(71) Applicant: Wangsu Science & Technology Co., Ltd., Shanghai (CN)

(72) Inventors: Jinpeng Lin, Shanghai (CN); Wencan Wang, Shanghai (CN); Shujia Dong, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 169 days.

(21) Appl. No.: 16/732,143

(22) Filed: Dec. 31, 2019

(65) Prior Publication Data

US 2020/0162245 A1 May 21, 2020

Related U.S. Application Data

(63) Continuation of application No. PCT/CN2018/088676, filed on May 28, 2018.

(30) Foreign Application Priority Data

Mar. 23, 2018 (CN) .......................... 201810247194.3

(51) Int. Cl.
*H04L 9/08* (2006.01)
*H04L 9/32* (2006.01)
(Continued)

(52) U.S. Cl.
CPC .......... *H04L 9/0819* (2013.01); *H04L 9/3242* (2013.01); *H04L 9/3249* (2013.01);
(Continued)

(58) Field of Classification Search
CPC .............. H04L 67/42; H04L 2463/062; H04L 63/0464; H04L 63/0478; H04L 63/06;
(Continued)

(56) References Cited

U.S. PATENT DOCUMENTS

2011/0264905 A1  10/2011  Ovsiannikov
2012/0106735 A1*  5/2012  Fukuda ................... H04L 9/083
                                                                    380/255
(Continued)

FOREIGN PATENT DOCUMENTS

CN        102801616 A       11/2012
CN        102932350 A        2/2013
(Continued)

OTHER PUBLICATIONS

Wangsu Science & Technology Co., Ltd., Office Action, CN 201810247194.3, dated Sep. 18, 2019, 9 pgs.
(Continued)

*Primary Examiner* — Olugbenga O Idowu
(74) *Attorney, Agent, or Firm* — USCH Law, PC

(57) ABSTRACT

The present disclosure provides a method and system for performing an SSL Handshake. In the method, during an SSL handshake with a target terminal, a target CDN node determines a target service server accessed by the target terminal and obtains information to be processed by a private key; the target CDN node sends a private key processing request to a private key server corresponding to the target service server, the private key processing request carries the information to be processed and target private key processing type information; the private key server processes the information to be processed based on the target private key processing type information and a private key of the target service server and sends a processing result to the target CDN node so that the target CDN node may continue to perform the SSL handshake with the target terminal according to the processing result.

20 Claims, 8 Drawing Sheets

(51) Int. Cl.
*H04L 29/06* (2006.01)
*H04L 67/01* (2022.01)

(52) U.S. Cl.
CPC ...... *H04L 63/0464* (2013.01); *H04L 63/0478* (2013.01); *H04L 67/42* (2013.01)

(58) Field of Classification Search
CPC ... H04L 63/168; H04L 67/141; H04L 9/0819; H04L 9/3242; H04L 9/32; H04L 9/321; H04L 9/3213; H04L 9/3249; H04L 67/02; H04L 2209/76; H04L 9/0844; H04L 9/14; H04L 9/3013; H04L 9/302; H04L 9/3263
See application file for complete search history.

(56) References Cited

U.S. PATENT DOCUMENTS

2015/0067338 A1  3/2015  Gero et al.
2020/0412551 A1* 12/2020 Gero ................... H04L 63/166

FOREIGN PATENT DOCUMENTS

| CN | 102948131 A | 2/2013 |
|---|---|---|
| CN | 105871797 A | 8/2016 |
| CN | 106161449 A | 11/2016 |
| CN | 106790090 A | 5/2017 |
| CN | 107707517 A | 2/2018 |
| WO | WO 2016/073552 A1 | 5/2016 |

OTHER PUBLICATIONS

Wangsu Science & Technology Co., Ltd., Office Action, CN 201810247194.3, dated Apr. 7, 2020, 10 pgs.
International Search Report, PCT/CN2018/088676, dated May 28, 2018, 4 pgs.
Wangsu Science and Technology, European Search Report, EU Application No. 18910272.6, dated Jun. 16, 2020, 10 pgs.
Sullivan, An Analysis of TLS Handshake Proxying, 2015 IEEE Trustcom/BigDataSE/ISPA, 8 pgs.

* cited by examiner

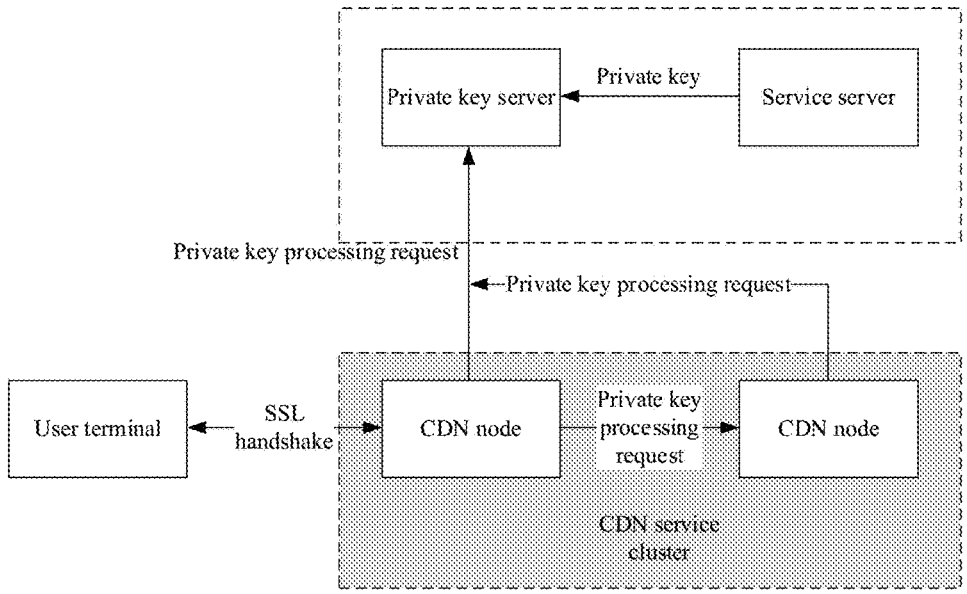

FIG. 1

201 — A target CDN node determines a target service server accessed by a target terminal and obtains information to be processed by a private key during the SSL handshake with the target terminal.

202 — The target CDN node sends a private key processing request to the private key server corresponding to the target service server.

203 — The private key server processes the information to be processed based on the target private key processing type information and a private key of the target service server, and sends a processing result to the target CDN node so that the target CDN node continues to perform the SSL handshake with the target terminal according to the processing result.

FIG. 2

METHOD AND SYSTEM FOR PERFORMING SSL HANDSHAKE

CROSS REFERENCE TO RELATED APPLICATIONS

The present application is a continuation of PCT Application No. PCT/CN2018/088676, filed on May 28, 2018, entitled "METHOD AND SYSTEM FOR PERFORMING SSL HANDSHAKE", which claims priority to Chinese Patent Application No. 201810247194.3, filed on Mar. 23, 2018, entitled "METHOD AND SYSTEM FOR PERFORMING SSL HANDSHAKE", the disclosure of each of which is incorporated herein by reference in its entirety.

TECHNICAL FIELD

The present disclosure relates to the field of wireless communication technology, in particular, to a method and system for performing an SSL handshake.

BACKGROUND

With the rapid development of the Internet, requirements for network transmission security are increasingly higher, and Hyper Text Transfer Protocol over Secure Socket Layer (HTTPS) has therefore emerged. HTTPS may be deemed to be a combination of Hyper Text Transfer Protocol (HTTP) and the Secure Sockets Layer/Transport Layer Security (SSL/TLS) protocol. Herein, the SSL/TLS protocol works under the HTTP protocol and is used to encrypt transmitted data to ensure that the data is not intercepted/eavesdropped during transmission on the network.

Each service server can be pre-configured with an SSL certificate. The SSL certificate is issued by a trusted digital Certification Authority (CA), and granted to the service server after verifying the identity of the service server. The SSL certificate is used for server identity verification and data encryption. Each SSL certificate includes a public key and a private key. When a terminal accesses the service server through HTTPS, it needs to perform an SSL handshake with the service server firstly. During the SSL handshake, the terminal and the service server have to negotiate about an encryption algorithm to be used. If the encryption algorithm is the RSA algorithm, the service server has to decrypt an encrypted premaster password by using the private key of the SSL certificate. If the encryption algorithm is the DH algorithm, the service server has to sign a DH premaster by using the private key of the SSL certificate.

During implementation of the present disclosure, the inventor finds that at least the following problems exist in the existing technology.

Under the Content Delivery Network (CDN) service architecture, the terminal generally obtains data from a CDN node, thus the terminal has to perform the SSL handshake with the CDN node. However, on the one hand, due to the need for confidentiality, some service servers cannot provide the private key to the outside, so these service servers cannot use the CDN service. On the other hand, private key processing during the SSL handshake has to consume a large number of CPU processing resources, and especially, when there is a large amount of concurrency of the SSL handshake, the CDN service provided by the CDN node may be significantly affected.

SUMMARY

In order to solve the problems in the existing technology, embodiments of the present disclosure provide a method and system for performing an SSL handshake.

In some embodiments, it is provided a method for performing an SSL handshake, comprising:
 determining, by a target CDN node, a target service server accessed by a target terminal and obtaining information to be processed by a private key during the SSL handshake with the target terminal;
 sending, by the target CDN node, a private key processing request to a private key server corresponding to the target service server, the private key processing request carrying the information to be processed and target private key processing type information; and
 processing, by the private key server, the information to be processed based on the target private key processing type information and a private key of the target service server, and sending a processing result to the target CDN node so that the target CDN node continues to perform the SSL handshake with the target terminal according to the processing result.

In some embodiments, determining, by the target CDN node, the target service server accessed by the target terminal and obtaining information to be processed by the private key during the SSL handshake with the target terminal comprises:
 determining, by the target CDN node, the target service server accessed by the target terminal according to a server identifier carried in a Client Hello message sent by the target terminal, and obtaining a premaster key carried in a Client Key Exchange message sent by the target terminal, where the premaster key is encrypted and is generated by the target terminal, during an RSA handshake with the target terminal under the TLS1.2 protocol.

In some embodiments, sending, by the target CDN node, the private key processing request to the private key server corresponding to the target service server, the private key processing request carrying the information to be processed and a target private key processing type, comprises:
 sending, by the target CDN node, the private key processing request to the private key server corresponding to the target service server, the private key processing request carrying the encrypted premaster key and an algorithm identifier of a target decryption algorithm negotiated with the target terminal.

In some embodiments, processing, by the private key server, the information to be processed based on the target private key processing type and the private key of the target service server; and sending the processing result to the target CDN node so that the target CDN node continues to perform the SSL handshake with the target terminal according to the processing result comprises:
 decrypting, by the private key server, the encrypted premaster key by using the private key of the target service server according to the target decryption algorithm, and sending a premaster key obtained through decryption to the target CDN node, so that the target CDN node continues to perform the SSL handshake with the target terminal according to the premaster key obtained through the decryption.

In some embodiments, determining, by the target CDN node, the target service server accessed by the target terminal and obtaining information to be processed by the private key during the SSL handshake with the target terminal comprises:
 determining, by the target CDN node, the target service server accessed by the target terminal according to a server identifier carried in a client hello message sent by the target terminal, and obtaining a DH parameter generated locally, during a DH handshake with the target terminal under the TLS1.2 protocol.

In some embodiments, sending, by the target CDN node, the private key processing request to the private key server corresponding to the target service server, the private key processing request carrying the information to be processed and target private key processing type information, comprises:

sending, by the target CDN node, the private key processing request to the private key server corresponding to the target service server, the private key processing request carrying the DH parameter and an algorithm identifier of a first signature algorithm negotiated with the target terminal.

In some embodiments, processing, by the private key server, the information to be processed based on the target private key processing type information and the private key of the target service server and sending the processing result to the target CDN node so that the target CDN node continues to perform the SSL handshake with the target terminal according to the processing result comprises:

signing, by the private key server, the DH parameter by using the private key of the target service server according to the first signature algorithm, and sending the signed DH parameter to the target CDN node, so that the target CDN node continues to perform the SSL handshake with the target terminal according to the signed DH parameter.

In some embodiments, determining, by the target CDN node, the target service server accessed by the target terminal and obtaining information to be processed by the private key during the SSL handshake with the target terminal comprises:

determining, by the target CDN node, the target service server accessed by the target terminal according to a server identifier carried in a client hello message sent by the target terminal, and obtaining a hash parameter generated locally, during a DH handshake with the target terminal under the TLS1.3 protocol, the hash parameter generated based on a handshake data packet and an SSL certificate of the target service server that interact with the target terminal.

In some embodiments, sending, by the target CDN node, the private key processing request to the private key server corresponding to the target service server, the private key processing request carrying the information to be processed and target private key processing type information, comprises:

sending, by the target CDN node, the private key processing request to the private key server corresponding to the target service server, the private key processing request carrying the hash parameter and an algorithm identifier of a second signature algorithm negotiated with the target terminal.

In some embodiments, processing, by the private key server, the information to be processed based on the target private key processing type information and the private key of the target service server and sending the processing result to the target CDN node so that the target CDN node continues to perform the SSL handshake with the target terminal according to the processing result comprises:

signing, by the private key server, the hash parameter by using the private key of the target service server according to the second signature algorithm, and sending the signed hash parameter to the target CDN node, so that the target CDN node continues to perform the SSL handshake with the target terminal according to the signed hash parameter.

In some embodiments, the private key processing request further carries an SSL certificate identifier of the target service server; and the method further comprises, before the private key server processes the information to be processed based on the target private key processing type information and the private key of the target service server:

searching, by the private key server, a private key list stored locally for a private key of the target service server corresponding to the SSL certificate identifier of the target service server.

In some embodiments, the private key processing request is an http1.0 or http2.0 request.

In some embodiments, sending, by the target CDN node, the private key processing request to the private key server corresponding to the target service server comprises:

determining, by the target CDN node, a next hop CDN node directed to the private key server corresponding to the target service server; and establishing an SSL bidirectional authentication channel between the target CDN node and the next hop CDN node, and sending the private key processing request to the next hop CDN node through the SSL bidirectional authentication channel so that the next hop CDN node sends the private key processing request to the private key server.

In some embodiments, the private key server is deployed in a CDN service cluster or at the target service server.

In some embodiments, it is provided a system for performing an SSL handshake, comprising: a CDN node and a private key server.

In some embodiments, a target CDN node is configured to determine a target service server accessed by a target terminal, obtain information to be processed by a private key during the SSL handshake with the target terminal, and to send a private key processing request to the private key server corresponding to the target service server, the private key processing request carries the information to be processed and target private key processing type information.

In some embodiments, the private key server is configured to process the information to be processed based on the target private key processing type information and a private key of the target service server, and to send a processing result to the target CDN node so that the target CDN node continues to perform the SSL handshake with the target terminal according to the processing result.

In some embodiments, the target CDN node is configured to:

determine the target service server accessed by the target terminal according to a server identifier carried in a client hello message sent by the target terminal, obtain a premaster key carried in a client key exchange message sent by the target terminal, where the premaster key is encrypted and is generated by the target terminal, during an RSA handshake with the target terminal under the TLS1.2 protocol, and send the private key processing request to the private key server corresponding to the target service server, the private key processing request carries the encrypted premaster key and an algorithm identifier of a target decryption algorithm negotiated with the target terminal.

In some embodiments, the private key server is configured to:

decrypt the encrypted premaster key by using the private key of the target service server according to the target decryption algorithm, and send a premaster key obtained through decryption to the target CDN node, so that the target CDN node continues to perform the SSL handshake with the target terminal according to the premaster key obtained through the decryption.

In some embodiments, the target CDN node is configured to:

determine the target service server accessed by the target terminal according to a server identifier carried in a client hello message sent by the target terminal and obtain a DH parameter generated locally during a DH handshake with the target terminal under the TLS1.2 protocol, and send the private key processing request to the private key server corresponding to the target service server, the private key processing request carries the DH parameter and an algorithm identifier of a first signature algorithm negotiated with the target terminal.

In some embodiments, the private key server is configured to:

sign the DH parameter by using the private key of the target service server according to the first signature algorithm, and send the signed DH parameter to the target CDN node, so that the target CDN node continues to perform the SSL handshake with the target terminal according to the signed DH parameter.

In some embodiments, the target CDN node is configured to:

determine the target service server accessed by the target terminal according to a server identifier carried in a client hello message sent by the target terminal, and obtain a hash parameter generated locally, during a DH handshake with the target terminal under the TLS1.3 protocol. Here the hash parameter is generated based on a handshake data packet and an SSL certificate of the target service server that interact with the target terminal. The target CDN node is further configured to send the private key processing request to the private key server corresponding to the target service server, the private key processing request carries the hash parameter and an algorithm identifier of a second signature algorithm negotiated with the target terminal; and In some embodiments, the private key server is configured to:

sign the hash parameter by using the private key of the target service server according to the second signature algorithm, and send the signed hash parameter to the target CDN node, so that the target CDN node continues to perform the SSL handshake with the target terminal according to the signed hash parameter.

In some embodiments, the private key processing request further carries an SSL certificate identifier of the target service server; and the private key server is further configured to:

search a private key list stored locally for a private key of the target service server corresponding to the SSL certificate identifier of the target service server.

In some embodiments, the private key processing request is an http1.0 or http2.0 request.

In some embodiments, the target CDN node is configured to:

determine a next hop CDN node directed to a private key server corresponding to the target service server, establish an SSL bidirectional authentication channel between the target CDN node and the next hop CDN node, and send the private key processing request to the next hop CDN node through the SSL bidirectional authentication channel so that the next hop CDN node sends the private key processing request to the private key server.

In some embodiments, the private key server is deployed in a CDN service cluster or at the target service server.

The technical solutions provided in the embodiments of the present disclosure result in the following advantageous effect:

In the embodiments of the present disclosure, a target CDN node determines a target service server accessed by a target terminal and obtains information to be processed by a private key during the SSL handshake with the target terminal; the target CDN node sends a private key processing request to a private key server corresponding to the target service server, the private key processing request carries the information to be processed and target private key processing type information; the private key server processes the information to be processed based on the target private key processing type information and a private key of the target service server, and sends a processing result to the target CDN node so that the target CDN node continues to perform the SSL handshake with the target terminal according to the processing result. In this way, by constructing a private key server, the service server does not have to provide a private key to the outside, thereby ensuring security of the private key. Besides, a private key processing is completed by a private key server, so as to save CPU processing resources of a CDN node and a service server, thereby ensuring service quality of a CDN service and a business service.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained according to the drawings without any inventive effort.

FIG. 1 is a schematic diagram of a network framework for performing an SSL handshake according to an embodiment of the present disclosure;

FIG. 2 is a method flowchart for performing the SSL handshake according to an embodiment of the present disclosure;

DETAILED DESCRIPTION

Figure 3:
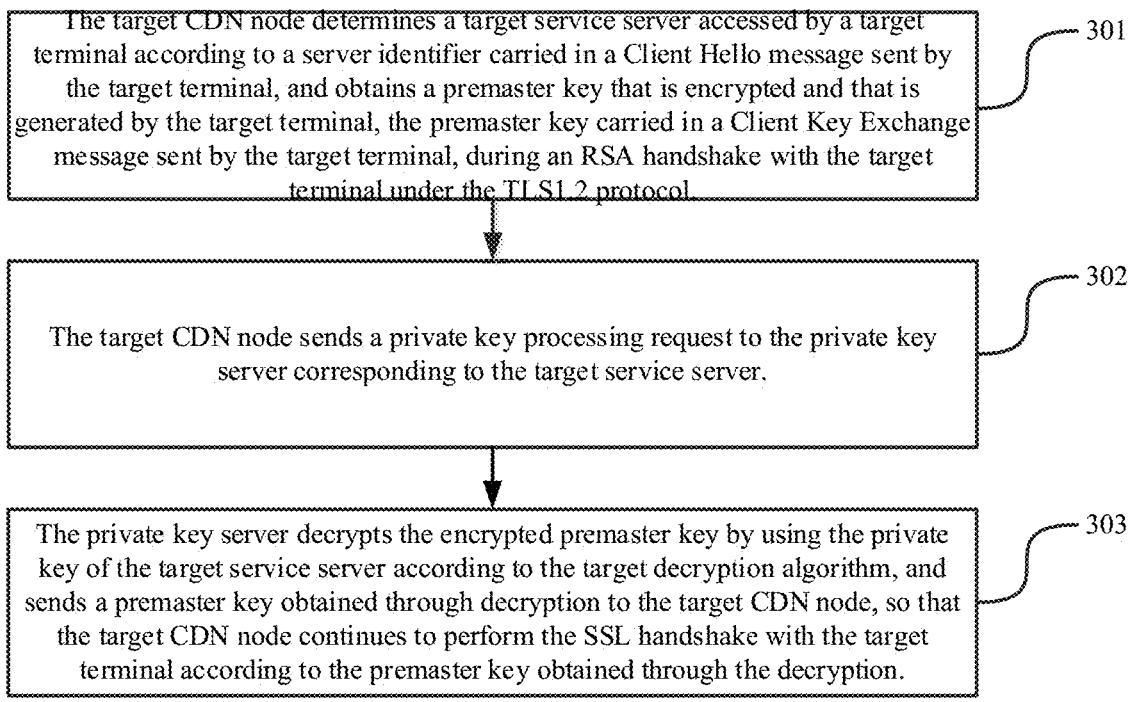
FIG. 3 is a method flowchart for performing an RSA handshake under the TLS1.2 protocol according to an embodiment of the present disclosure.

In order to make the objective, the technical solutions and the advantages of the present disclosure clearer, the embodiments of the present disclosure will be further described in details with reference to the accompany drawings.

An embodiment of the present disclosure provides a method for performing an SSL handshake. The method may be implemented by a CDN node server (hereinafter referred to as a CDN node) and a private key server together. Herein, the CDN node may be any node server in a CDN service cluster for receiving a data request from a user terminal. The CDN node may store a service data (such as a web page data and a resource file) provided by a service server, and may further store an SSL certificate of the service server and a corresponding public key. The private key server may be a server deployed at the service server and is configured to store a private key of the service server and provide a private key processing function. A network framework of the above-described scenario is shown in FIG. 1. Both the above-described CDN node and private key server may include a processor, a memory and a transceiver. The processor may be configured to perform the SSL handshake as described in the following processing. The memory may be configured to store data required in the following processing and data generated. The transceiver may be configured to receive and send relevant data during the following processing.

In the following, the processing shown in FIG. 2 is described in detail with specific implementations which may be as follows.

In step 201, a target CDN node determines a target service server accessed by a target terminal and obtains information to be processed by a private key during the SSL handshake with the target terminal.

In implementation, when a user is intended to access a certain website or obtain a certain data resource through a terminal, the user may send, through a terminal, an access request of a corresponding service server (the target service server is taken as an example below for description). The CDN service cluster may receive the access request, and then select one CDN node (such as the target CDN node) to provide a business service to the terminal. Further, the CDN service cluster may feed back to the terminal an Internet Protocol (IP) address of the target CDN node. Afterwards, the terminal may first establish a Transmission Control Protocol (TCP) connection with the target CDN node based on the IP address of the target CDN node, and then perform the SSL handshake with the target CDN node via the TCP connection.

During the SSL handshake with the target terminal, the target CDN node may determine the target service server that the target terminal is intended to access through a server identifier carried in a Client Hello message sent by the target terminal. The server identifier may be domain name information or an IP address of the server. Meanwhile, the target CDN node may obtain the information to be processed by the private key.

In step 202, the target CDN node sends a private key processing request to the private key server corresponding to the target service server.

Herein, the private key processing request carries the information to be processed and target private key processing type information.

In implementation, after the target CDN node obtains the information to be processed by the private key, the target CDN node may first determine an IP address of the private key server corresponding to the target service server, and then send the above-described information to be processed to the private key server in a form of the private key processing request and on the basis of the IP address, and indicate a corresponding private key processing type (i.e., carrying the target private key processing type information).

Alternatively, the private key processing request may be an http1.0 or http2.0 request.

In implementation, after the target CDN node obtains the information to be processed, an http1.0 or http2.0 request may be structured. The information to be processed and the target private key processing type information are added to the http1.0 or http2.0 request, and then the http1.0 or http2.0 request may be sent to the private key server. It shall be noted that if the http2.0 request is applied as the private key processing request, a multiplexing characteristic of the http2.0 request may be used, so as to reduce the number of connections between the target CDN node and other network devices during transmission. Further, a header compression function of the http2.0 request may be applied to reduce data transmission quantity.

Alternatively, the private key processing request may be transmitted through a CDN network, and an intelligent routing selection function of the CDN node is applied to accelerate transmission of the private key processing request. Correspondingly, the processing of step 202 may be as follows: the target CDN node determines a next hop CDN node directed to the private key server corresponding to the target service server; an SSL bidirectional authentication channel between the target CDN node and the next hop CDN node is established, and the private key processing request is sent to the next hop CDN node through the SSL bidirectional authentication channel so that the next hop CDN node sends the private key processing request to the private key server.

In implementation, when sending the private key processing request to the private key server, the target CDN node may perform the intelligent routing selection according to a network condition between nodes in the CDN service cluster, so as to determine the next hop CDN node directed to the private key server. Afterwards, the SSL bidirectional authentication channel between the target CDN node and the next hop CDN node that is selected is established, and the private key processing request is sent to the next hop CDN node through the SSL bidirectional authentication channel. Further, a following CDN node (including the above-described next hop CDN node) may refer to the above-described processing, and each following CDN node sends a private key processing request through the next hop CDN node selected by intelligent routing, until the private key processing request reaches the private key server. In this way, on the one hand, transmission of the private key processing request may be accelerated through the CDN service cluster. On the other hand, the SSL bidirectional authentication channel may prevent a service provided by the private server from being called by an untrusted network device or prevent the private key server from being masqueraded by an untrusted network device.

In step 203, the private key server processes the information to be processed based on the target private key processing type information and a private key of the target service server, and sends a processing result to the target CDN node so that the target CDN node continues to perform the SSL handshake with the target terminal according to the processing result.

In implementation, the private key server may receive the private key processing request sent by the target CDN node and extract the information to be processed and the target private key processing type information carried in the private key processing request. Afterwards, the private key server may read a locally stored private key of the target service server, and then process the information to be processed by using the private key on the basis of the target private key processing type information. Further, the private key server may feed back a result of the processing to the target CDN node. In this way, the target CDN node may continue to perform the SSL handshake with the target terminal according to the processing result after receiving the above-described processing result. It shall be noted that on the basis of the above-described CDN service cluster and the processing of the SSL bidirectional authentication channel transmitting the private key processing request, the private key server in this step may feed back the processing result to the target CDN node through a path selected by the intelligent routing and on the basis of the SSL bidirectional authentication channel that is established already.

Alternatively, the private server may store private keys of a plurality of service servers, thus the private processing request may further carry an SSL certificate identifier of the target service server. Correspondingly, there may be a processing before step 203 as follows: the private key server searches a private key list stored locally for the private key of the target service server corresponding to the SSL certificate identifier of the target service server.

In implementation, the private key server may be provided to a plurality of service servers to perform private key processing. Therefore, the private key server may maintain a private key list which records a corresponding relationship between SSL certificate identifiers of the service server and private keys of the service server. In this way, the private key server, after receiving the private key processing request sent by the target CDN node, may obtain the SSL certificate identifier of the target service server carried in the private key processing request. Further, the private key server may search the private key list stored locally for the private key of the target service server corresponding to the SSL certificate identifier of the target service server.

In combination with different versions of handshake procedures, the processing from step 201 to step 203 is described in detail as follows.

I. An RSA handshake under the TLS1.2 protocol. As shown in FIG. 3:

In step 301, a target CDN node determines a target service server accessed by a target terminal according to a server identifier carried in a Client Hello message sent by the target terminal, and obtains a premaster key carried in a Client Key Exchange message sent by the target terminal and the premaster key is encrypted and is generated by the target terminal, during an RSA handshake with the target terminal under the TLS1.2 protocol.

In step 302, the target CDN node sends the private key processing request to the private key server corresponding to the target service server.

Herein, the private key processing request carries the encrypted premaster key and an algorithm identifier of a target decryption algorithm negotiated with the target terminal.

In step 303, the private key server decrypts the encrypted premaster key by using the private key of the target service server according to the target decryption algorithm, and sends a premaster key obtained through decryption to the target CDN node, so that the target CDN node continues to perform the SSL handshake with the target terminal according to the premaster key obtained through the decryption.

Figure 4:
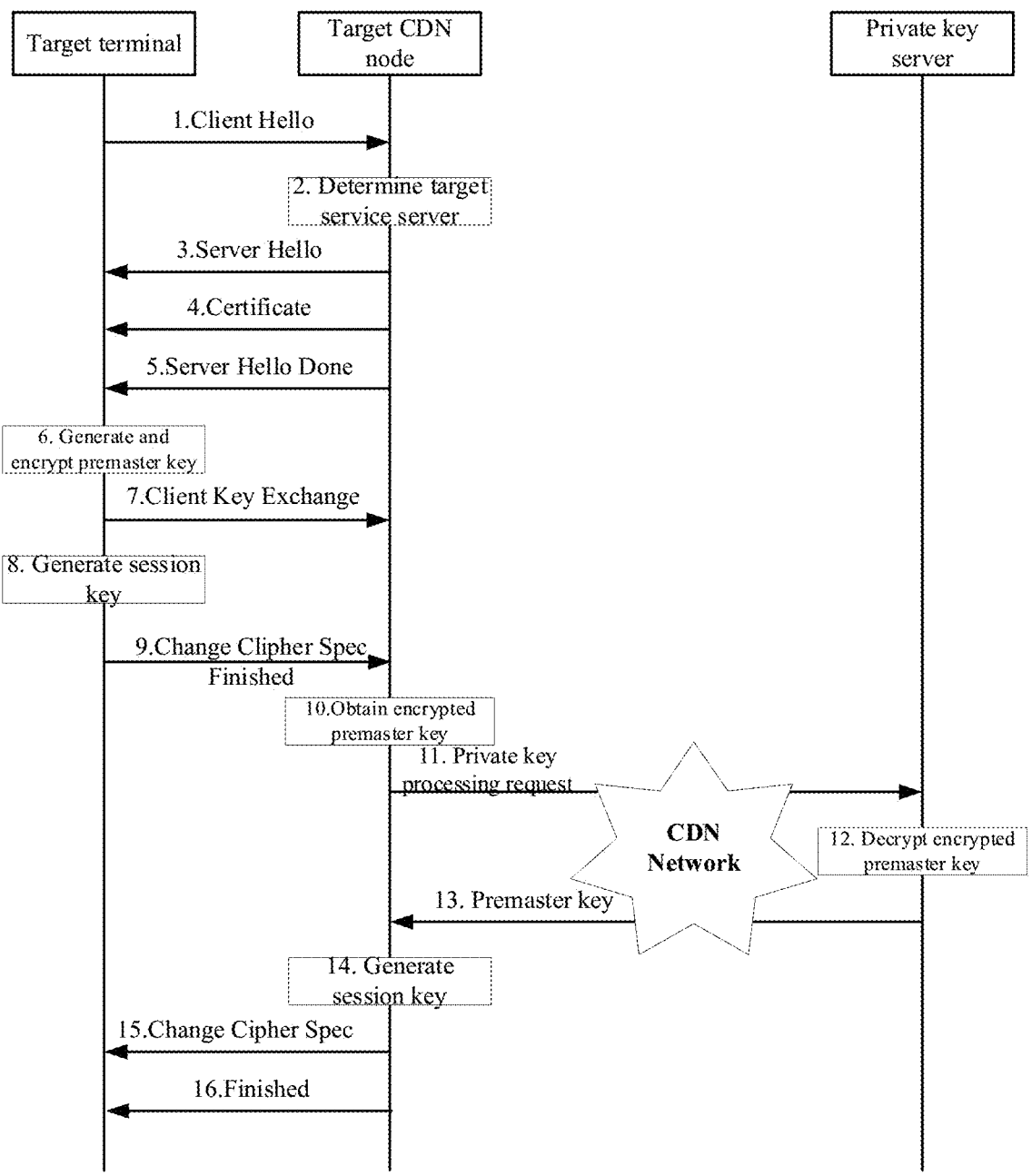
FIG. 4 is a TLS1.2 RSA handshake signaling diagram according to an embodiment of the present disclosure.

In implementation, FIG. 4 is a TLS1.2 RSA handshake signaling diagram, a content of which may specifically be as follows.

1. A target terminal sends a Client Hello message to a target CDN node. The Client Hello message carries a SSL protocol version supported by the terminal, an algorithm suite list, an SSL extended data (containing a server identifier of a target service server), and a client random number.

2. After receiving the Client Hello message, the target CDN node determines the target service server accessed by the target terminal according to the server identifier carried in the Client Hello message.

3. The target CDN node returns a Server Hello message to the target terminal. The Server Hello message carries a selected SSL protocol version (which is TLS1.2 herein), a selected algorithm suite (containing the target decryption algorithm and a generation algorithm of a session key) and a Server random number.

4. The target CDN node sends a Certificate message to the target terminal. The Certificate message carries an SSL certificate of the target service server and a corresponding certificate chain (for verifying identity of the SSL certificate). The SSL certificate contains a public key.

5. The target CDN node sends a Server Hello Done message to the target terminal, which indicates completion of the processing of the target CDN node and waits for response of the target terminal.

6. The target terminal generates a premaster key and uses the public key to encrypt the premaster key.

7. The target terminal sends the Client Key Exchange message to the target CDN node. The Client Key Exchange message carries an encrypted premaster key.

8. The target terminal generates a session key through cooperation of the premaster key with the server random number and the client random number on the basis of a generation algorithm of a selected session key.

9. The target terminal sends a Change Cipher Spec message to the target CDN node, and then sends a Finished message.

10. The target CDN node obtains the encrypted premaster key carried in the Client Key Exchange message after receiving the Client Key Exchange message.

11. The target CDN node sends a private key processing request to the private key server corresponding to the target service server through a CDN network. The private key processing request carries the encrypted premaster key and an algorithm identifier of the target decryption algorithm.

12. The private key server decrypts the encrypted premaster key by using the private key of the target service server according to the target decryption algorithm.

13. The private key server sends a premaster key obtained through decryption to the target CDN node.

14. The target CDN node obtains the premaster key, and generates a session key through cooperation of the premaster key with the server random number and the client random number on the basis of the generation algorithm of the selected session key.

15. The target CDN node sends the Change Cipher Spec to the target terminal, indicating completion of key negotiation and that the following messages will be encrypted by using the session key.

16. The target CDN node sends the Finished message to the target terminal and completes the SSL handshake with the target terminal.

It shall be noted that the above-described processing is also applicable to an RSA handshake procedure under a protocol such as the SSL3 protocol, the TLS1.0 protocol and the TLS1.1 protocol.

Figure 5:
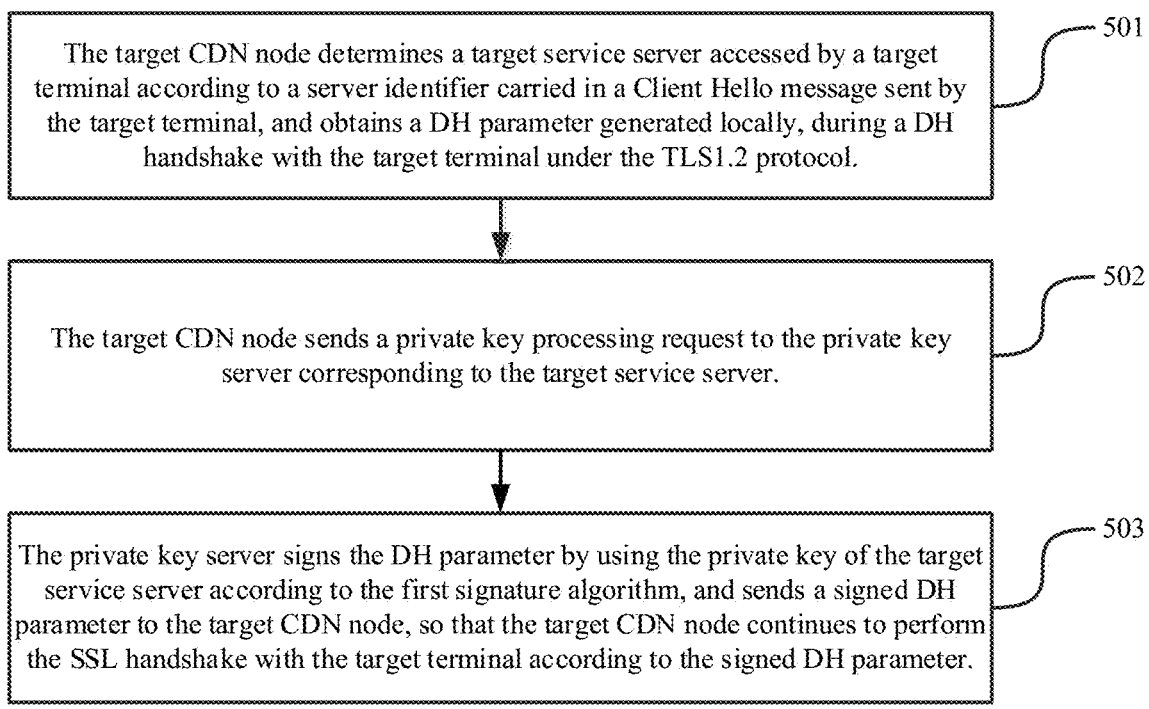
FIG. 5 is a method flowchart for performing a DH handshake under the TLS1.2 protocol according to an embodiment of the present disclosure.

II. A DH handshake under the TLS1.2 protocol. As shown in FIG. 5:

In step 501, a target CDN node determines a target service server accessed by a target terminal according to a server identifier carried in a Client Hello message sent by the target terminal, and obtains a DH parameter generated locally, during a DH handshake with the target terminal under the TLS1.2 protocol.

In step 502, the target CDN node sends a private key processing request to a private key server corresponding to the target service server.

Herein, the private key processing request carries the DH premaster and an algorithm identifier of a first signature algorithm negotiated with the target terminal.

In step 503, the private key server signs the DH parameter by using the private key of the target service server according to the first signature algorithm, and sends a signed DH parameter to the target CDN node, so that the target CDN node continues to perform the SSL handshake with the target terminal according to the signed DH parameter.

Figure 6:
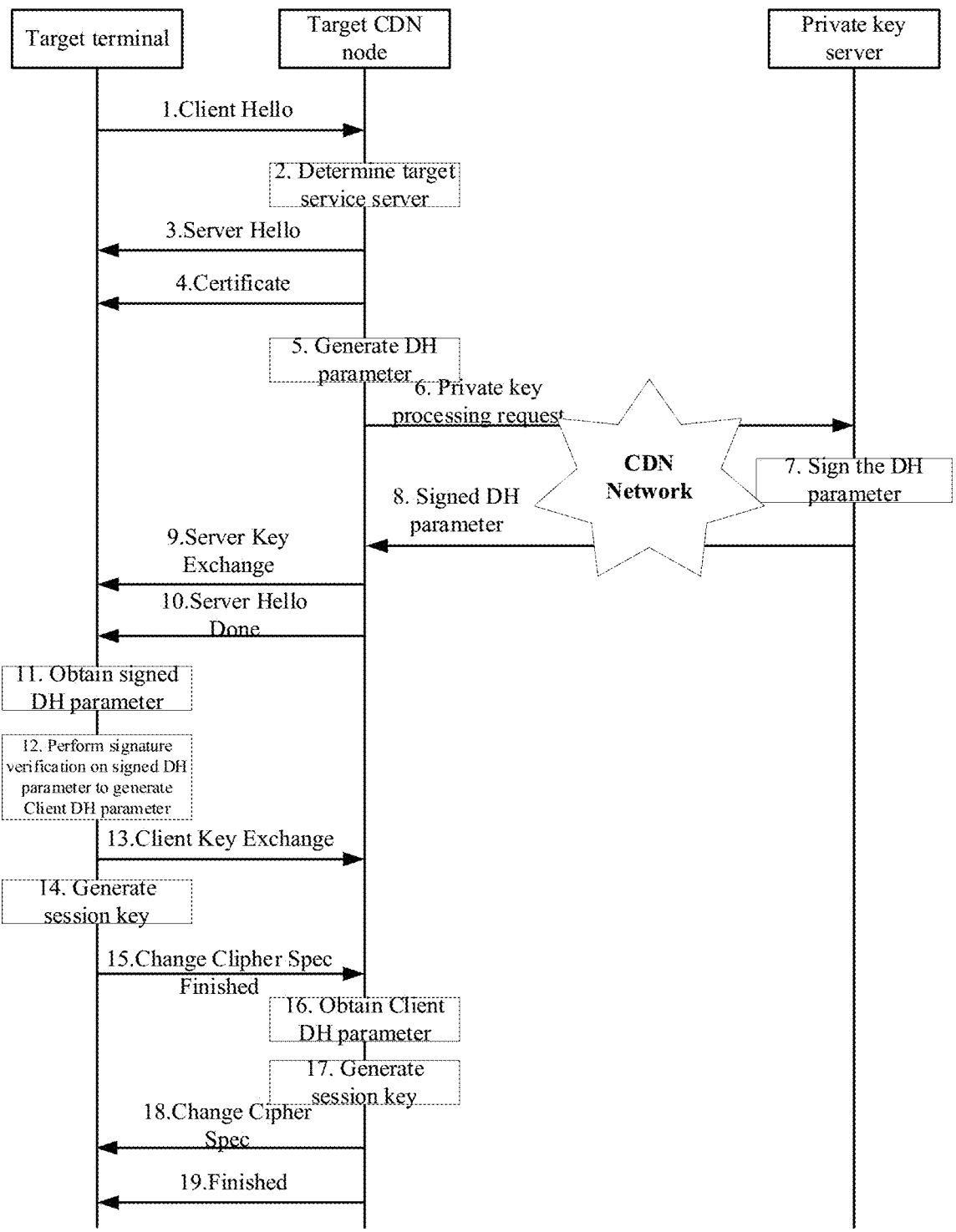
FIG. 6 is a TLS1.2 DH handshake signaling diagram according to an embodiment of the present disclosure.

In implementation, FIG. 6 is a TLS1.2 DH handshake signaling diagram, a content of which may specifically be as follows.

1. A target terminal sends a Client Hello message to a target CDN node. The Client Hello message carries a SSL protocol version supported by the terminal, an algorithm suite list, and an SSL extended data (containing a server identifier of a target service server), and a Client random number.

2. After receiving the Client Hello message, the target CDN node determines a target service server accessed by the target terminal according to the server identifier carried in the Client Hello message.

3. The target CDN node returns a Server Hello message to the target terminal. The Server Hello message carries a selected SSL protocol version (which is TLS1.2 herein), a selected algorithm suite (containing the first signature algorithm and a generation algorithm of a session key) and a Server random number.

4. The target CDN node sends a Certificate message to the target terminal. The Certificate message carries an SSL certificate of the target service server and a corresponding certificate chain (for verifying identity of the SSL certificate). The SSL certificate contains a public key.

5. The target CDN node generates a DH parameter.

6. The target CDN node sends a private key processing request to the private key server corresponding to the target service server through the CDN network. The private key processing request carries the DH parameter and an algorithm identifier of the first signature algorithm.

7. The private key server signs the DH parameter by using the private key of the target service server according to the first signature algorithm.

8. The private key server sends the signed DH parameter to the target CDN node.

9. The target CDN node obtains the signed DH parameter and sends a Server Key Exchange message to the target terminal. The Server Key Exchange message carries the signed DH parameter.

10. The target CDN node sends a Server Hello Done message to the target terminal, which indicates completion of the target CDN node and waits for response of the target terminal.

11. The target terminal obtains the signed DH premaster carried in the Server Key Exchange message after receiving the Server Key Exchange message.

12. The target terminal performs signature verification on the signed DH parameter by using the public key to generate a Client DH parameter.

13. The target terminal sends a Client Key Exchange message to the target CDN node. The Client Key Exchange message carries the Client DH parameter.

14. The target terminal generates a session key through cooperation of the Client DH parameter with the server random number and the client random number on the basis of a generation algorithm of a selected session key.

15. The target terminal sends a Change Cipher Spec message to the target CDN node, and then sends a Finished message.

16. The target CDN node obtains the Client DH parameter carried in the Client Key Exchange message after receiving the Client Key Exchange message.

17. The target CDN node generates a session key through cooperation of the Client DH parameter with the server random number and the client random number on the basis of the generation algorithm of the selected session key.

18. The target CDN node sends the Change Cipher Spec to the target terminal, indicating completion of key negotiation and that the following messages will be encrypted by using the session key.

19. The target CDN node sends a Finished message to the target terminal and completes the SSL handshake with the target terminal.

It shall be noted that the above-described processing is also applicable to a DH handshake procedure under a protocol such as the SSL3 protocol, the TLS1.0 protocol and the TLS1.1 protocol.

Figure 7:
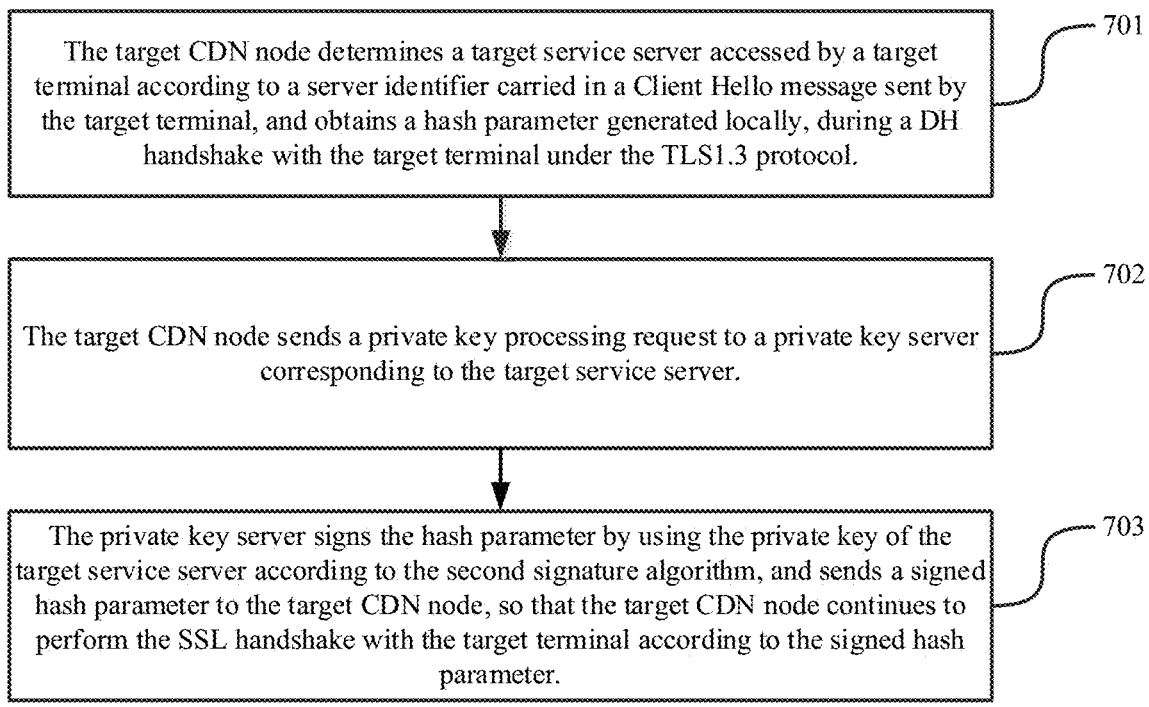
FIG. 7 is a method flowchart for performing a DH handshake under the TLS1.3 protocol according to an embodiment of the present disclosure.

III. A DH handshake under the TLS1.3 protocol. As shown in FIG. 7:

In step 701, a target CDN node determines a target service server accessed by a target terminal according to a server identifier carried in a Client Hello message sent by the target terminal, and obtains a hash parameter generated locally, during a DH handshake with the target terminal under the TLS1.3 protocol.

Herein, the hash parameter is generated on the basis of a handshake data packet and an SSL certificate of the target service server that interact with the target terminal.

In step 702, the target CDN node sends a private key processing request to a private key server corresponding to the target service server.

Herein, the private key processing request carries the hash parameter and an algorithm identifier of a second signature algorithm negotiated with the target terminal.

In step 703, the private key server signs the hash parameter by using the private key of the target service server according to the second signature algorithm, and sends a signed hash parameter to the target CDN node, so that the target CDN node continues to perform the SSL handshake with the target terminal according to the signed hash parameter.

Figure 8:
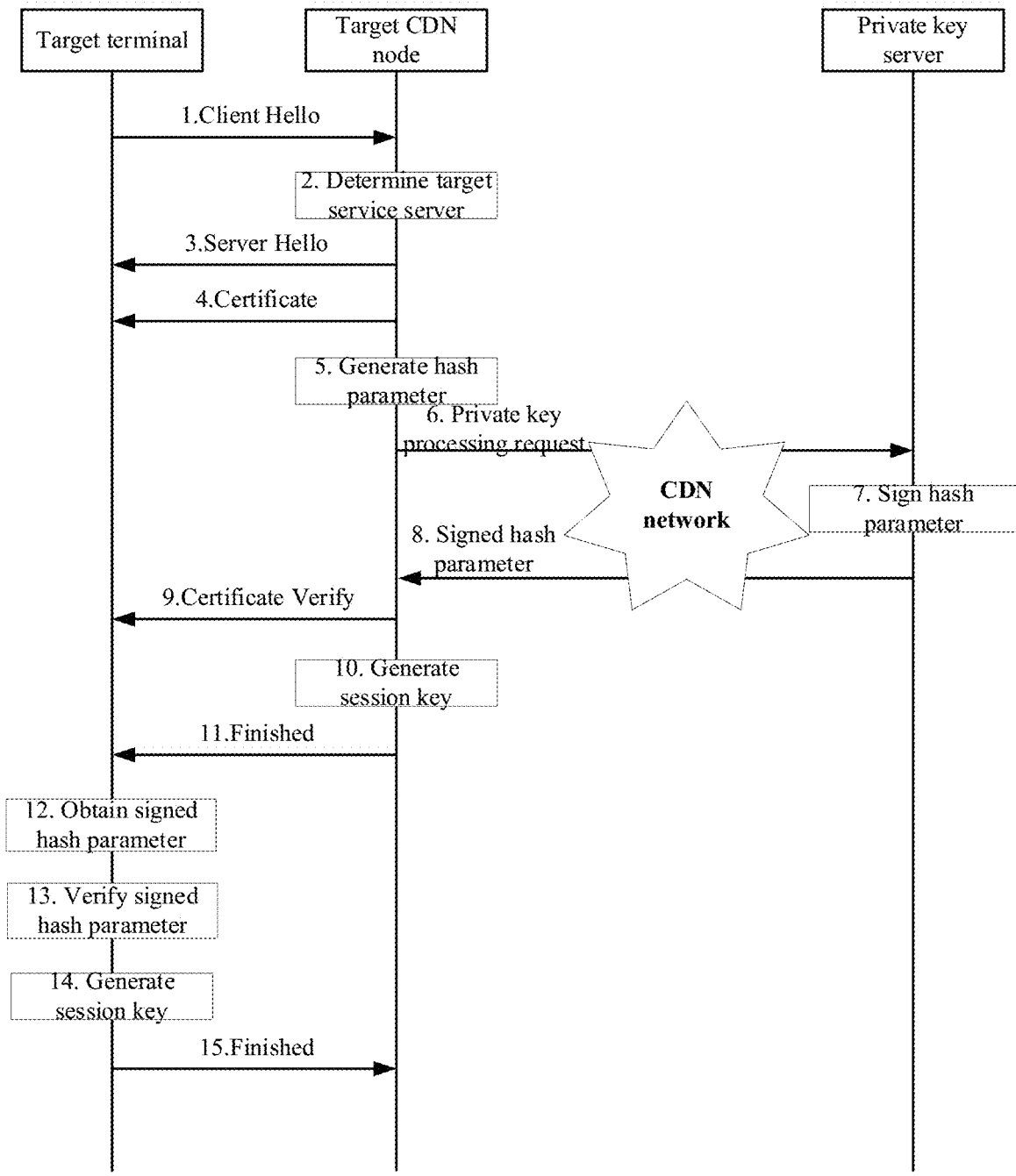
FIG. 8 is a TLS1.3 DH handshake signaling diagram according to an embodiment of the present disclosure.

In implementation, FIG. 8 is a TLS1.3 DH handshake signaling diagram, a content of which may specifically be as follows.

1. a target terminal sends a Client Hello message to a target CDN node. The Client Hello message carries a SSL protocol version supported by the terminal, an algorithm suite list, and an SSL expansion data (containing a server identifier of the target service server), a key_share extended data (containing a DH type supported by the terminal and a DH parameter), and a Client random number.

2. After receiving the Client Hello message, the target CDN node determines the target service server accessed by the target terminal according to the server identifier carried in the Client Hello message.

3. The target CDN node returns a Server Hello message to the target terminal. The Server Hello message carries a selected SSL protocol version (which is TLS1.3 herein), a selected algorithm suite (containing a second signature algorithm and a generation algorithm of a session key), a key_share extended data (containing a selected DH type and a DH parameter), and a Server random number.

4. The target CDN node sends a Certificate message to the target terminal. The Certificate message carries the SSL certificate of the target service server and a corresponding certificate chain (for verifying identity of the SSL certificate). The SSL certificate containing the public key.

5. The CDN node generates a hash parameter on the basis of a handshake data packet and an SSL certificate of the target service server that interact with the target terminal.

6. The target CDN node sends a private key processing request to the private key server corresponding to the target service server through the CDN network. The private key processing request carries the hash parameter and the algorithm identifier of the second signature algorithm.

7. The private key server signs the hash parameter by using the private key of the target service server according to the second signature algorithm.

8. The private key server sends the signed hash parameter to the target CDN node.

9. The target CDN node obtains the signed hash parameter and sends a Certificate Verify message to the target terminal. The Certificate Verify message carries the signed hash parameter.

10. The target CDN node generates a session key through cooperation of the selected DH type and DH parameter with the server random number and the client random number on the basis of a generation algorithm of a selected session key.

11. The target CDN node sends a Finished message to the target terminal.

12. After receiving the Certificate Verify message, the target terminal obtains the signed hash parameter carried by the Certificate Verify message.

13. The target terminal performs signature verification on the signed hash parameter by using the public key.

14. The target terminal generates a session key through cooperation of the selected DH type and DH parameter with the server random number and the client random number on the basis of the generation algorithm of the selected session key.

15. The target terminal sends a Finished message to the target CDN node and completes the SSL handshake with the target terminal.

In embodiments of the present disclosure, a target CDN node determines a target service server accessed by a target terminal and obtains information to be processed by a private key during the SSL handshake with the target terminal; the target CDN node sends a private key processing request to a private key server corresponding to the target service server, the private key processing request carrying the information to be processed and target private key processing type information; the private key server processes the information to be processed based on the target private key processing type information and a private key of the target service server, and sends a processing result to the target CDN node so that the target CDN node continues to perform the SSL handshake with the target terminal according to the processing result. In this way, by constructing a private key server, the service server does not have to provide a private key to the outside, thereby ensuring security of the private key. Besides, a private key processing is completed by a private key server, so as to save CPU processing resources of a CDN node and a service server, thereby ensuring service quality of a CDN service and a business service.

Figure 9:
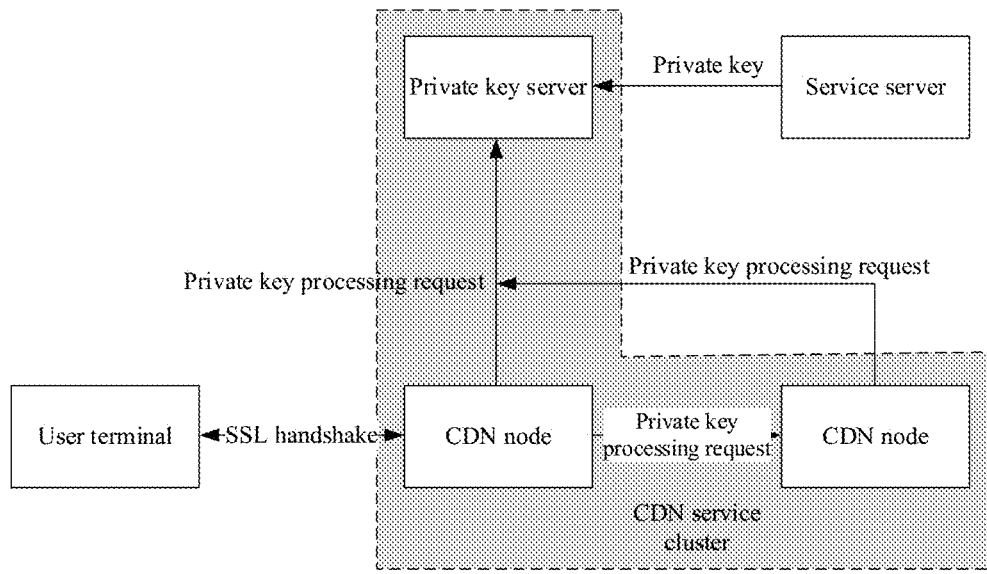
FIG. 9 is a schematic diagram of a network framework for performing an SSL handshake according to another embodiment of the present disclosure.

In another embodiment, a private server may be a server that is deployed in a CDN service cluster, that is configured to store a private key of a service server, and that provides a function of private key processing. A specific network framework may be as shown in FIG. 9. Since private key processing in an SSL handshake may consume a large amount of CPU processing resources, and especially when there is a large amount of concurrency of the SSL handshake, a CDN service provided by a CDN node may be significantly affected. A private key processing cluster may be set up in the CDN service cluster. The private key processing cluster includes a large number of private key servers that may store private keys of a plurality of service servers. In this way, during an SSL handshake with a target terminal, a target CDN node may first determine a target service server accessed by the target terminal, and obtain information to be processed by a private key, and may then determine, in the private key processing cluster, a target private key server storing a private key of the target service server and send a private key processing request to the target private key server. The private key processing request may carry information to be processed and target private key processing type information. Further, the target private key server may process the information to be processed on the basis of the target private key processing type information and the private key of the target service server, and send a processing result to the target CDN node, so that the target CDN node continues to perform the SSL handshake with the target terminal according to the processing result.

Figure 10:
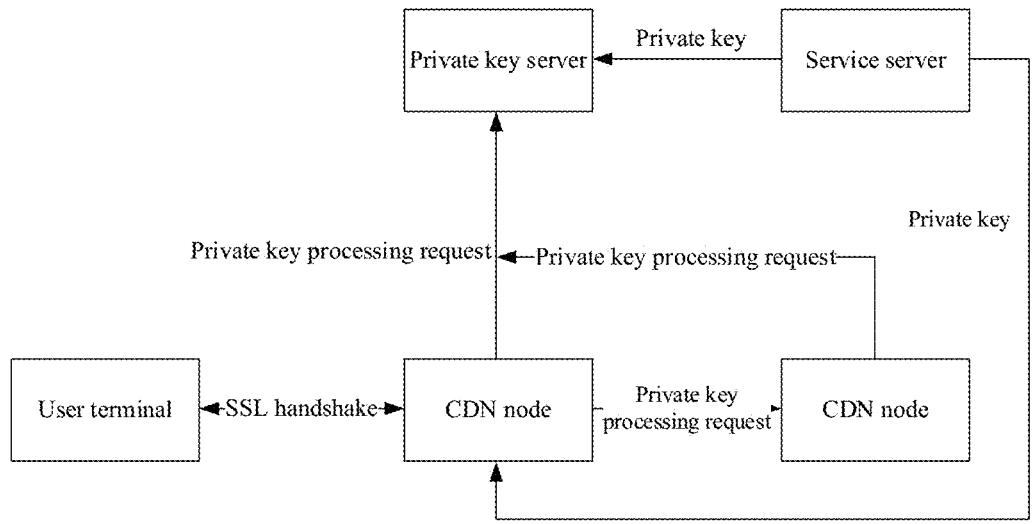
FIG. 10 is a schematic diagram of a network framework for performing an SSL handshake according to still another embodiment of the present disclosure.

In another embodiment, apart from deploying a private server, some CDN nodes may also store a private key of a service server, and a specific network framework may be as shown in FIG. 10. During an SSL handshake with a terminal, after a CDN node sends a private key processing request to a private key server through a CDN network, if no processing result fed back by the private key server is received within a preset time period, the CDN node may perform private key processing by using a private key stored locally. Further, if no response is obtained after private key processing requests are sent multiple times continuously to the private key server, the CDN node may perform the private key processing by directly using the private key stored locally during the SSL handshake within a following preset time period. Further, before sending the private key processing request to the private server, the CDN node may further detect a current local load. If the current local load is greater than a preset threshold, the CDN node sends a private key processing request to the private key server. If the current local load is less than the preset threshold, the CDN node may perform the private key processing by using the private key stored locally.

In each private key server as described above, an SSL acceleration card may be applied to implement a relevant private key processing. The SSL acceleration card provides an interface. When a private key server calls the interface, a private key and information to be processed may be used as interface parameters to be transmitted to the SSL acceleration card.

On the basis of the same technical concept, an embodiment of the present disclosure further provides a system for performing an SSL handshake. The system includes a CDN node and a private key server.

A target CDN node is configured to determine a target service server accessed by a target terminal, obtain information to be processed by a private key during the SSL handshake with the target terminal, and send a private key processing request to the private key server corresponding to the target service server. The private key processing request carries the information to be processed and target private key processing type information.

The private key server is configured to process the information to be processed based on the target private key processing type information and a private key of the target service server, and send a processing result to the target CDN node so that the target CDN node continues to perform the SSL handshake with the target terminal according to the processing result.

Alternatively, the target CDN node is configured to:

determine the target service server accessed by the target terminal according to a server identifier carried in a Client Hello message sent by the target terminal, obtain a premaster key that is encrypted and that is generated by the target terminal, the premaster key carried in a Client Key Exchange message sent by the target terminal, during an RSA handshake with the target terminal under the TLS1.2 protocol, and send the private key processing request to the private key server corresponding to the target service server. The private key processing request carries the encrypted premaster key and an algorithm identifier of a target decryption algorithm negotiated with the target terminal.

The private key server is configured to:

decrypt the encrypted premaster key by using the private key of the target service server according to the target decryption algorithm, and send a premaster key obtained through decryption to the target CDN node, so that the target CDN node continues to perform the SSL handshake with the target terminal according to the premaster key obtained through the decryption.

Alternatively, the target CDN node is configured to:

determine the target service server accessed by the target terminal according to a server identifier carried in a Client Hello message sent by the target terminal and obtain a DH parameter generated locally during a DH handshake with the target terminal under the TLS1.2 protocol, and send the private key processing request to the private key server corresponding to the target service server. The private key processing request carries the DH parameter and an algorithm identifier of a first signature algorithm negotiated with the target terminal.

The private key server is configured to:

sign the DH parameter by using the private key of the target service server according to the first signature algorithm, and send the signed DH parameter to the target CDN node, so that the target CDN node continues to perform the SSL handshake with the target terminal according to the signed DH parameter.

Alternatively, the target CDN node is configured to:

determine the target service server accessed by the target terminal according to a server identifier carried in a Client Hello message sent by the target terminal, and obtain a hash parameter generated locally, during a DH handshake with the target terminal under the TLS1.3 protocol. The hash parameter is generated based on a handshake data packet and an SSL certificate of the target service server that interact with the target terminal. The target CDN node is configured to send the private key processing request to the private key server corresponding to the target service server, and the private key processing request carries the hash parameter and an algorithm identifier of a second signature algorithm negotiated with the target terminal.

The private key server is configured to:

sign the hash parameter by using the private key of the target service server according to the second signature algorithm, and send the signed hash parameter to the target CDN node, so that the target CDN node continues to perform the SSL handshake with the target terminal according to the signed hash parameter.

Alternatively, the private key processing request further carries an SSL certificate identifier of the target service server.

The private key server is further configured to:

search a private key list stored locally for the private key of the target service server corresponding to the SSL certificate identifier of the target service server.

Alternatively, the private key processing request is an http1.0 or http2.0 request.

Alternatively, the target CDN node is configured to:

determine a next hop CDN node directed to the private key server corresponding to the target service server, establish an SSL bidirectional authentication channel between the target CDN node and the next hop CDN node, and send the private key processing request to the next hop CDN node through the SSL bidirectional authentication channel so that the next hop CDN node sends the private key processing request to the private key server.

Alternatively, the private key server is deployed in a CDN service cluster or at the target service server.

In this embodiment of the present disclosure, a target CDN node determines a target service server accessed by a target terminal and obtains information to be processed by a private key during the SSL handshake with the target terminal; the target CDN node sends a private key processing request to a private key server corresponding to the target service server, the private key processing request carrying the information to be processed and target private key processing type information; the private key server processes the information to be processed based on the target private key processing type information and a private key of the target service server, and sends a processing result to the target CDN node so that the target CDN node continues to perform the SSL handshake with the target terminal according to the processing result. In this way, by constructing a private key server, the service server does not have to provide a private key to the outside, thereby ensuring security of the private key. Besides, a private key processing is completed by a private key server, so as to save CPU processing resources of a CDN node and a service server, thereby ensuring service quality of a CDN service and a business service.

Those skilled in the art may appreciate that all or some steps that implement the above-described embodiments may be completed by hardware, or may be completed by a program that instructs relevant hardware. The program may be stored in a computer readable storage medium. The above-described storage medium may be a Read-Only Memory, a magnetic disc or an optical disc.

The above-described are only preferable embodiments of the present disclosure, but are not used to impose a limitation to the present disclosure. Any modification, equivalent substitution and improvement made within the spirit and principle of the present disclosure shall be included in the protection scope of the present disclosure.

What is claimed is:

1. A method for performing a Secure Sockets Layer (SSL) handshake, comprising:
   determining, by a target Content Delivery Network (CDN) node, a target service server accessed by a target terminal and obtaining, by the target CDN node, information to be processed by a private key during the SSL handshake with the target terminal;

sending, by the target CDN node, a private key processing request to a private key server corresponding to the target service server when a current local load is greater than a preset threshold, the private key processing request carrying the information to be processed and target private key processing type information;

processing, by the private key server, the information to be processed based on the target private key processing type information and a private key of the target service server, and sending, by the private key server, a processing result to the target CDN node so that the target CDN node continues to perform the SSL handshake with the target terminal according to the processing result;

wherein:

the target CDN node performs the private key processing by using the private key stored locally, when the current local load is less than the preset threshold or when no response is obtained within a preset time period after the private key processing request is sent; or the target CDN node performs the private key processing by using the private key stored locally during the SSL handshake within a subsequent preset time period, when no response is obtained after private key processing requests have been sent multiple times in a row to the private key server.

2. The method according to claim 1, wherein determining, by the target CDN node, the target service server accessed by the target terminal and obtaining information to be processed by the private key during the SSL handshake with the target terminal comprises:

determining, by the target CDN node, the target service server accessed by the target terminal according to a server identifier carried in a Client Hello message sent by the target terminal, and obtaining, by the target CDN node, a premaster key carried in a Client Key Exchange message sent by the target terminal, during an RSA handshake with the target terminal under the TLS1.2 protocol; wherein, the premaster key is encrypted and is generated by the target terminal;

wherein sending, by the target CDN node, the private key processing request to the private key server corresponding to the target service server, the private key processing request carrying the information to be processed and a target private key processing type information, comprises:

sending, by the target CDN node, the private key processing request to the private key server corresponding to the target service server, the private key processing request carrying the premaster key that is encrypted and an algorithm identifier of a target decryption algorithm negotiated with the target terminal; and wherein processing, by the private key server, the information to be processed based on the target private key processing type information and the private key of the target service server and sending the processing result to the target CDN node so that the target CDN node continues to perform the SSL handshake with the target terminal according to the processing result comprises:

decrypting, by the private key server, the premaster key that is encrypted by using the private key of the target service server according to the target decryption algorithm, and sending, by the private key server, a premaster key obtained through decryption to the target CDN node, so that the target CDN node continues to perform the SSL handshake with the target terminal according to the premaster key obtained through the decryption.

3. The method according to claim 1, wherein determining, by the target CDN node, the target service server accessed by the target terminal and obtaining information to be processed by the private key during the SSL handshake with the target terminal comprises:

determining, by the target CDN node, the target service server accessed by the target terminal according to a server identifier carried in a client hello message sent by the target terminal, and obtaining, by the target CDN node, a DH parameter generated locally, during a DH handshake with the target terminal under the TLS1.2 protocol;

wherein sending, by the target CDN node, the private key processing request to the private key server corresponding to the target service server, the private key processing request carrying the information to be processed and target private key processing type information, comprises:

sending, by the target CDN node, the private key processing request to the private key server corresponding to the target service server, the private key processing request carrying the DH parameter and an algorithm identifier of a first signature algorithm negotiated with the target terminal; and wherein processing, by the private key server, the information to be processed based on the target private key processing type information and the private key of the target service server and sending the processing result to the target CDN node so that the target CDN node continues to perform the SSL handshake with the target terminal according to the processing result comprises:

signing, by the private key server, the DH parameter by using the private key of the target service server according to the first signature algorithm, and sending, by the private key server, the signed DH parameter to the target CDN node, so that the target CDN node continues to perform the SSL handshake with the target terminal according to the signed DH parameter.

4. The method according to claim 1, wherein determining, by the target CDN node, the target service server accessed by the target terminal and obtaining information to be processed by the private key during the SSL handshake with the target terminal comprises:

determining, by the target CDN node, the target service server accessed by the target terminal according to a server identifier carried in a client hello message sent by the target terminal, and obtaining, by the target CDN node, a hash parameter generated locally, during a DH handshake with the target terminal under the TLS1.3 protocol; wherein the hash parameter is generated based on a handshake data packet and an SSL certificate of the target service server that interact with the target terminal;

wherein sending, by the target CDN node, the private key processing request to the private key server corresponding to the target service server, the private key processing request carrying the information to be processed and target private key processing type information, comprises:

sending, by the target CDN node, the private key processing request to the private key server corresponding to the target service server, the private key processing request carrying the hash parameter and an algorithm identifier of a second signature algorithm negotiated with the target terminal; and wherein processing, by the private key server, the information to be processed based on the target private key processing type information and the private key of the target service server and sending the processing result to the target CDN node so that the target CDN node continues to perform the SSL handshake with the target terminal according to the processing result comprises:

signing, by the private key server, the hash parameter by using the private key of the target service server according to the second signature algorithm, and sending, by the private key server, the signed hash parameter to the target CDN node, so that the target CDN node continues to perform the SSL handshake with the target terminal according to the signed hash parameter.

5. The method according to claim 1, wherein the private key processing request further carries an SSL certificate identifier of the target service server; and wherein before the private key server processes the information to be processed based on the target private key processing type information and the private key of the target service server, the method further comprises:

the private key server searches a private key list stored locally for the private key of the target service server corresponding to the SSL certificate identifier of the target service server.

6. The method according to any of claim 5, wherein the private key server is deployed in a CDN service cluster or at the target service server.

7. The method according to claim 1, wherein the private key processing request is an http1.0 or http2.0 request.

8. The method according to claim 1, wherein sending, by the target CDN node, the private key processing request to the private key server corresponding to the target service server comprises:

determining, by the target CDN node, a next hop CDN node directed to the private key server corresponding to the target service server;

establishing an SSL bidirectional authentication channel between the target CDN node and the next hop CDN node, and sending a private key processing request to the next hop CDN node through the SSL bidirectional authentication channel so that the next hop CDN node sends a private key processing request to the private key server.

9. The method according to any of claim 8, wherein the private key server is deployed in a CDN service cluster or at the target service server.

10. The method according to any of claim 1, wherein the private key server is deployed in a CDN service cluster or at the target service server.

11. A system for performing a Secure Sockets Layer (SSL) handshake, comprising: a target Content Delivery Network (CDN) node and a private key server, wherein:

a target CDN node is configured to determine a target service server accessed by a target terminal, obtain information to be processed by a private key during the SSL handshake with the target terminal, and send a private key processing request to the private key server corresponding to the target service server when a current local load is greater than a preset threshold, the private key processing request carries the information to be processed and target private key processing type information; and the private key server is configured to process the information to be processed based on the target private key processing type information and a private key of the target service server, and send a processing result to the target CDN node so that the target CDN node continues to perform the SSL handshake with the target terminal according to the processing result;

wherein:

the target CDN node is further configured to perform the private key processing by using the private key stored locally, when the current local load is less than the preset threshold or when no response is obtained within a preset time period after the private key processing request is sent; or the target CDN node is further configured to perform the private key processing by using the private key stored locally during the SSL handshake within a subsequent preset time period, when no response is obtained after private key processing requests have been sent multiple times in a row to the private key server.

12. The system according to claim 11, wherein the target CDN node is specifically configured to:

determine the target service server accessed by the target terminal according to a server identifier carried in a client hello message sent by the target terminal, obtain a premaster key carried in a client key exchange message sent by the target terminal, during an RSA handshake with the target terminal under the TLS1.2 protocol, wherein the premaster key is encrypted and is generated by the target terminal; and the target CDN node is configured to send the private key processing request to the private key server corresponding to the target service server, the private key processing request carrying the premaster key that is encrypted and an algorithm identifier of a target decryption algorithm negotiated with the target terminal;

the private key server is specifically configured to:

decrypt the premaster key that is encrypted by using the private key of the target service server according to the target decryption algorithm, and send a premaster key obtained through decryption to the target CDN node, so that the target CDN node continues to perform the SSL handshake with the target terminal according to the premaster key obtained through the decryption.

13. The system according to claim 11, wherein the target CDN node is specifically configured to:

determine the target service server accessed by the target terminal according to a server identifier carried in a client hello message sent by the target terminal and obtain a DH parameter generated locally during a DH handshake with the target terminal under the TLS1.2 protocol, and send the private key processing request to the private key server corresponding to the target service server, the private key processing request carrying the DH parameter and an algorithm identifier of a first signature algorithm negotiated with the target terminal; and the private key server is specifically configured to:

sign the DH parameter by using the private key of the target service server according to the first signature algorithm, and send the signed DH parameter to the target CDN node, so that the target CDN node continues to perform the SSL handshake with the target terminal according to the signed DH parameter.

14. The system according to claim 11, wherein the target CDN node is specifically configured to:

determine the target service server accessed by the target terminal according to a server identifier carried in a client hello message sent by the target terminal, and obtain a hash parameter generated locally, during a DH handshake with the target terminal under the TLS1.3 protocol, wherein the hash parameter is generated based on a handshake data packet and an SSL certificate of the target service server that interact with the target terminal;

the target CDN node is configured to send the private key processing request to the private key server corresponding to the target service server, the private key processing request carrying the hash parameter and an algorithm identifier of a second signature algorithm negotiated with the target terminal; and the private key server is specifically configured to:

sign the hash parameter by using the private key of the target service server according to the second signature algorithm, and send the signed hash parameter to the target CDN node, so that the target CDN node continues to perform the SSL handshake with the target terminal according to the signed hash parameter.

15. The system according to claim 11, wherein the private key processing request further carries an SSL certificate identifier of the target service server; and the private key server is further configured to:

search a private key list stored locally for the private key of the target service server corresponding to the SSL certificate identifier of the target service server.

16. The system according to any of claim 15, wherein the private key server is deployed in a CDN service cluster or at the target service server.

17. The system according to claim 11, wherein the private key processing request is an http1.0 or http2.0 request.

18. The system according to claim 11, wherein the target CDN node is specifically configured to:

determine a next hop CDN node directed to the private key server corresponding to the target service server, establish an SSL bidirectional authentication channel between the target CDN node and the next hop CDN node, and send a private key processing request to the next hop CDN node through the SSL bidirectional authentication channel so that the next hop CDN node sends a private key processing request to the private key server.

19. The system according to any of claim 18, wherein the private key server is deployed in a CDN service cluster or at the target service server.

20. The system according to any of claim 11, wherein the private key server is deployed in a CDN service cluster or at the target service server.

\* \* \* \* \*